(12) United States Patent
Tsuno

(10) Patent No.: US 12,679,355 B2
(45) Date of Patent: Jul. 14, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Koshi Tsuno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 18/519,267

(22) Filed: Nov. 27, 2023

(65) Prior Publication Data

US 2024/0174225 A1 May 30, 2024

(30) Foreign Application Priority Data

Nov. 28, 2022 (JP) ................................. 2022-189193

(51) Int. Cl.
  *B60Q 1/38* (2006.01)
  *B60W 30/12* (2020.01)
  (Continued)

(52) U.S. Cl.
  CPC .............. *B60W 30/12* (2013.01); *G08G 1/167* (2013.01); *B60W 2540/20* (2013.01)

(58) Field of Classification Search
  CPC .............. B60W 30/12; B60W 2540/20; B60W 30/18163; B60W 40/04; B60W 2554/80; B60Q 1/38; G08G 1/167; G08G 1/16
  (Continued)

(56) References Cited

U.S. PATENT DOCUMENTS

2019/0047469 A1* 2/2019 Nishiguchi .............. B60Q 1/40
2019/0071076 A1* 3/2019 Nakatsuka ........... B60W 30/09
  (Continued)

FOREIGN PATENT DOCUMENTS

JP 2014-038520 2/2014
JP 2018-158684 10/2018
  (Continued)

OTHER PUBLICATIONS

Japanese Office Action for Japanese Patent Application No. 2022-189193 mailed May 28, 2024.

*Primary Examiner* — Hossam M Abd El Latif
(74) *Attorney, Agent, or Firm* — Amin, Turocy & Watson, LLP

(57) ABSTRACT

A vehicle control device includes a storage medium configured to store computer-readable instructions and a processor connected to the storage medium, in which the processor executes the computer-readable instructions to recognize a surrounding situation of a vehicle, generate a target route of the vehicle on the basis of the recognized surrounding situation to perform lane keeping control of the vehicle along the target route, and stop the lane keeping control while a direction indicator is activated in both of a first case in which the direction indicator is continuously operated by operating an operating unit from a reference position to a first position and a second case in which the direction indicator is activated a predetermined number of times or for a predetermined period of time by operating the operating unit from the reference position to a second position where an amount of operation is smaller than at the first position.

5 Claims, 6 Drawing Sheets

(51) Int. Cl.
B60W 30/18 (2012.01)
B60W 40/04 (2006.01)
G08G 1/16 (2006.01)

(58) Field of Classification Search
USPC .......................................................... 701/23
See application file for complete search history.

(56) References Cited

U.S. PATENT DOCUMENTS

| | | | | | |
|---|---|---|---|---|---|
| 2019/0315358 | A1* | 10/2019 | Kim | ................ | B60W 30/18163 |
| 2020/0307582 | A1* | 10/2020 | Sato | ...................... | B60W 50/10 |
| 2021/0101600 | A1* | 4/2021 | Kato | ........................ | B60Q 1/40 |
| 2024/0010277 | A1* | 1/2024 | Karve | ...................... | B62D 5/30 |

FOREIGN PATENT DOCUMENTS

| | | |
|---|---|---|
| JP | 2019-034622 | 3/2019 |
| JP | 2021-066197 | 4/2021 |
| JP | 2022-121177 | 8/2022 |

* cited by examiner

FIG. 4

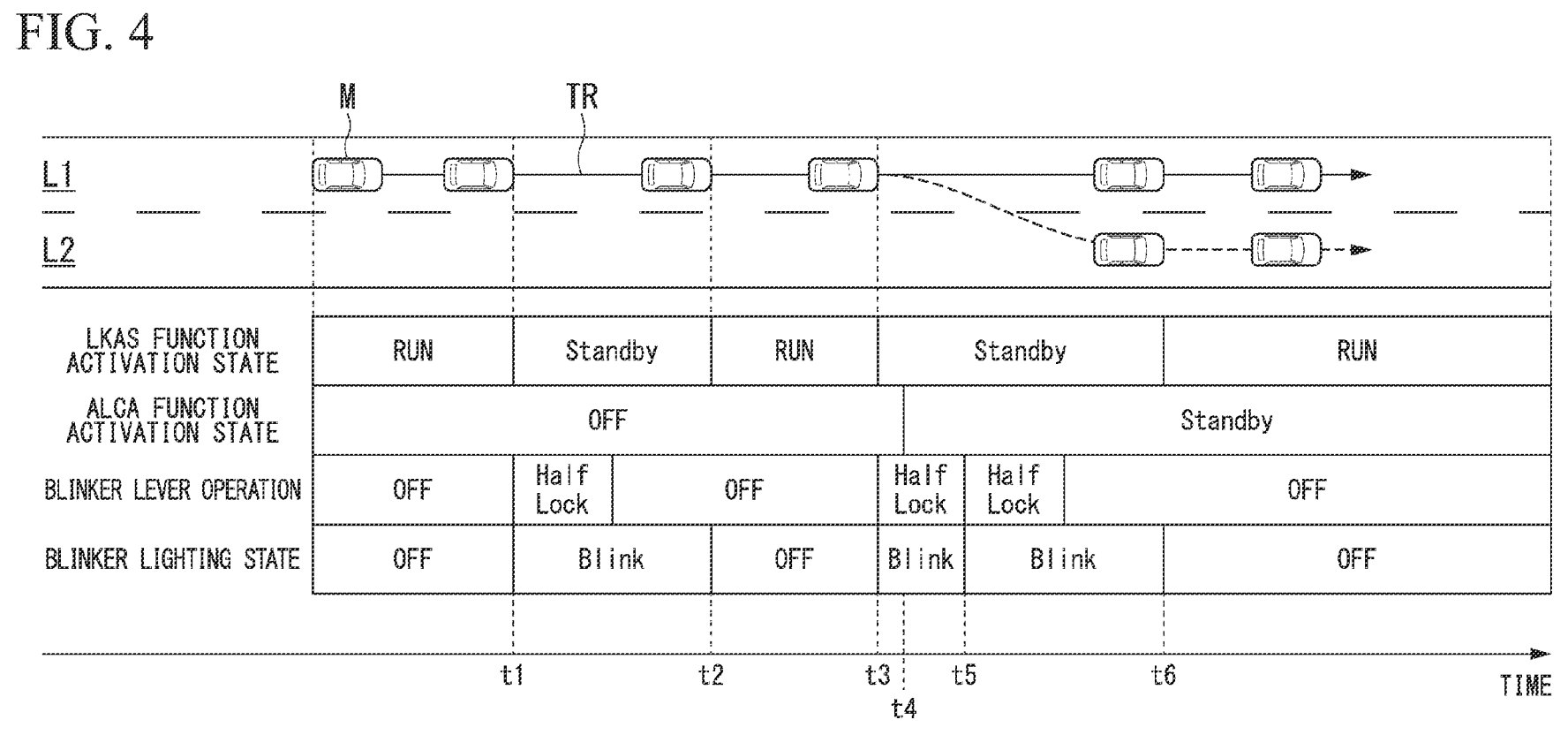

| | RUN | Standby | RUN | | | Standby | | RUN |
|---|---|---|---|---|---|---|---|---|
| LKAS FUNCTION ACTIVATION STATE | | | | | | | | |
| ALGA FUNCTION ACTIVATION STATE | OFF | | | | OFF | | | |
| BLINKER LEVER OPERATION | OFF | Half Lock | OFF | | Half Lock | Half Lock | OFF | |
| BLINKER LIGHTING STATE | OFF | Blink | OFF | | Blink | Blink | OFF | |
| | | t1 | t2 | t3 | t4 | t5 | t6 | TIME |

| | | t1 | | t2 | | t3 | | t4 | t5 | | t6 | TIME |
|---|---|---|---|---|---|---|---|---|---|---|---|---|
| LKAS FUNCTION ACTIVATION STATE | RUN | | Standby | | RUN | | Standby | | Standby (ALCA) | | RUN | |
| ALCA FUNCTION ACTIVATION STATE | | OFF | | | | | Standby | | RUN | | Standby | |
| BLINKER LEVER OPERATION | OFF | Half Lock | | OFF | | OFF | | Half Lock | OFF | Half Lock | OFF | |
| BLINKER LIGHTING STATE | OFF | Blink | | OFF | | OFF | | Blink | OFF | Blink | OFF | |

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2022-189193, filed Nov. 28, 2022, the entire contents of which is incorporated herein by reference.

BACKGROUND

Field of the Invention

The present invention relates to a vehicle control device, a vehicle control method, and a storage medium.

Description of Related Art

Conventionally, lane keeping control is known in which a vehicle is controlled so that it travels within a traveling lane. For example, Japanese Unexamined Patent Application, First Publication No. 2019-034622 discloses a technology that alerts an occupant by vibrating a steering wheel when a host vehicle has approached lane markings that divide a host lane until a distance between the lane markings and the host vehicle becomes equal to or less than a predetermined distance.

The technology described in Japanese Unexamined Patent Application, First Publication No. 2019-034622 allows lane keeping control to be continued regardless of an activation state of lane change control of causing a host vehicle to automatically change lanes from a host lane to an adjacent lane even if an occupant presses a blinker lever halfway during execution of the lane keeping control. In this case, even if the occupant attempts to change lanes by a manual steering operation, the lane keeping control may be activated which may impair a steering sense of the occupant.

SUMMARY

The present invention has been made in view of such circumstances, and an object thereof is to provide a vehicle control device, a vehicle control method, and a storage medium that can improve a steering sense of an occupant during lane keeping control. Consequently, this will contribute to development of a sustainable transportation system.

The vehicle control device, the vehicle control method, and the storage medium according to the present invention have adopted the following configuration.

(1): A vehicle control device according to one aspect of the present invention includes a storage medium configured to store computer-readable instructions, and a processor connected to the storage medium, in which the processor executes the computer-readable instructions to recognize a surrounding situation of a vehicle, generate a target route of the vehicle on the basis of the recognized surrounding situation to perform lane keeping control of the vehicle along the target route, and stop the lane keeping control while a direction indicator is activated in both of a first case in which the direction indicator is continuously operated by operating an operating unit from a reference position to a first position and a second case in which the direction indicator is activated a predetermined number of times or for a predetermined period of time by operating the operating unit from the reference position to a second position where an amount of operation is smaller than at the first position.

(2): In the aspect of (1) described above, the processor may determine whether it is possible to perform lane change control on the basis of the surrounding situation when the operating unit is operated to the second position, and performs lane change control from a lane in which the vehicle is traveling to an adjacent lane in a direction in which the operating unit is operated when it is determined that it is possible to perform the lane change control.

(3): In the aspect of (2) described above, the processor may stop the lane keeping control during activation of the direction indicator when the operating unit is operated to the second position and it is determined that it is not possible to perform the lane change control.

(4): In the aspect of (3) described above, when the operating unit is operated to the second position, the processor may stop the lane keeping control and the lane change control during the activation of the direction indicator even if determination on whether it is possible to perform the lane change control is changed from a state of being impossible to a state of being possible on the basis of the surrounding situation during the activation of the direction indicator.

(5): In the aspect of (3) described above, when determination on whether it is possible to perform the lane change control is changed from a state of being impossible to a state of being possible on the basis of the surrounding situation during the activation of the direction indicator after the operating unit is operated to the second position, the processor may stop the lane keeping control and the lane change control for a certain period of time even if the operating unit is operated to the second position again.

(6): A vehicle control method according to another aspect of the present invention includes, by a computer, recognizing a surrounding situation of a vehicle, generating a target route of the vehicle on the basis of the recognized surrounding situation to perform lane keeping control of the vehicle along the target route, and stopping the lane keeping control while a direction indicator is activated in both of a first case in which the direction indicator is continuously operated by operating an operating unit from a reference position to a first position and a second case in which the direction indicator is activated a predetermined number of times or for a predetermined period of time by operating the operating unit from the reference position to a second position where an amount of operation is smaller than at the first position.

(7): A computer-readable non-transitory storage medium according to still another aspect of the present invention stores a program causing a computer to execute recognizing a surrounding situation of a vehicle, generating a target route of the vehicle on the basis of the recognized surrounding situation to perform lane keeping control of the vehicle along the target route, and stopping the lane keeping control while a direction indicator is activated in both of a first case in which the direction indicator is continuously operated by operating an operating unit from a reference position to a first position and a second case in which the direction indicator is activated a predetermined number of times or for a predetermined period of time by operating the operating unit from the reference position to a second position where an amount of operation is smaller than at the first position.

According to the aspects of (1) to (7), it is possible to improve a steering sense of an occupant during lane keeping control.

BRIEF DESCRIPTION OF THE DRAWINGS

FIG. 4 is a diagram which shows another example of the flow of the control of the LKAS and the ALCA according to the present embodiment.

FIG. 5 is a diagram which shows still another example of the flow of the control of the LKAS and the ALCA according to the present embodiment.

DESCRIPTION OF EMBODIMENTS

Hereinafter, embodiments of a vehicle control device, a vehicle control method, and a storage medium of the present invention will be described with reference to the drawings. The vehicle control device according to the present embodiment is configured to stop lane keeping control when a blinker operation is executed by an occupant during execution of lane keeping control for vehicles. Details of the vehicle control device according to the present embodiment will be described below.

[Overall Configuration]

Figure 1:
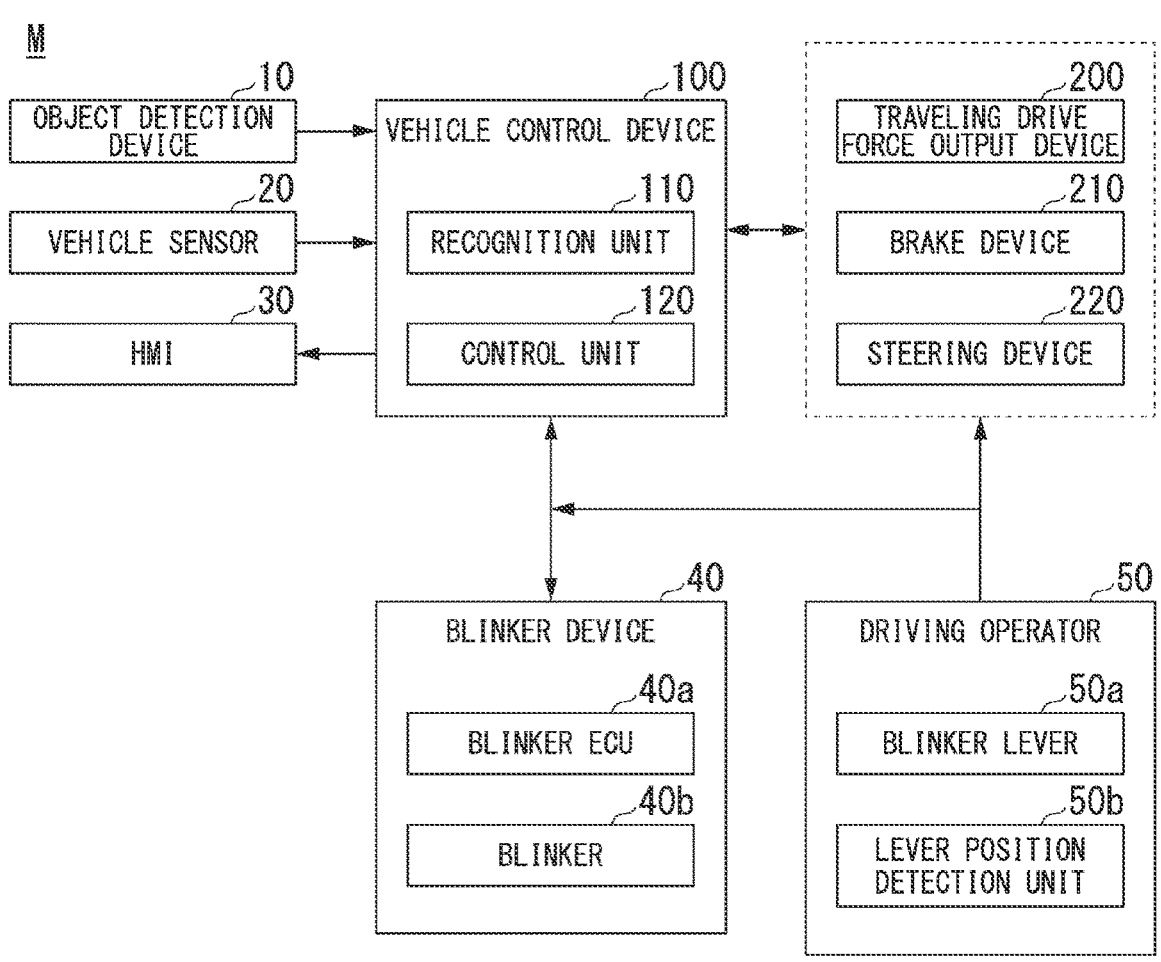
FIG. 1 is a configuration diagram which mainly shows a vehicle control device according to an embodiment.

FIG. 1 is a configuration diagram which mainly shows a vehicle control device 100 according to an embodiment. The vehicle control device 100 is mounted in a vehicle. In addition to the vehicle control device 100, for example, an object detection device 10, a vehicle sensor 20, an HMI 30, a blinker (a direction indicator) device 40, a driving operator 50, and a traveling drive force output device 200, a brake device 210, a steering device 220, and other components are mounted in this vehicle (hereinafter referred to as a host vehicle M). Note that the configuration shown in FIG. 1 is just an example, and a part of the configuration may be omitted therefrom, or another configuration may also be added thereto.

The object detection device 10 includes, for example, some or all of a camera, a radar device, a light detection and ranging (LIDAR), a sensor fusion device, and the like. The object detection device 10 is a device for detecting an object, with at least a detection range of a traveling direction side of the host vehicle M. The camera is, for example, a digital camera using a solid-state imaging device such as a charge coupled device (CCD) or a complementary metal oxide semiconductor (CMOS). The camera can be attached to any place on the host vehicle M. When the front is imaged, the camera is attached to a top of the front windshield or a rear surface of the rearview mirror. For example, the camera periodically and repeatedly captures images of surroundings of the host vehicle M. The camera may be a stereo camera or a distance sensor. The radar device emits radio waves such as millimeter waves to the surroundings of the host vehicle M, and detects radio waves (reflected waves) reflected by an object to detect at least a position (a distance and a direction) of the object. The radar device may detect the position and a speed of an object according to a frequency modulated continuous wave (FM-CW) method. LIDAR emits light (or electromagnetic waves with a wavelength close to that of light) to the surroundings of the host vehicle M and measures scattered light. LIDAR detects a distance to a target on the basis of a time from light emission to light reception. The emitted light is, for example, a pulsed laser light. A sensor fusion device performs sensor fusion processing on results of detection by some or all of a camera, a radar device, and an LIDAR to recognize the position, type, speed, and the like of an object. The object detection device 10 may include an image analysis device that exclusively performs camera image analysis instead of the sensor fusion device. This image analysis device may be one function of the vehicle control device 100. The object detection device 10 outputs a result of recognition to the vehicle control device 100.

The vehicle sensor 20 includes a vehicle speed sensor that detects a speed of the host vehicle M, an acceleration sensor that detects the acceleration, a yaw rate sensor that detects the angular speed around the vertical axis, an azimuth sensor that detects a direction of the host vehicle M, and the like. Each sensor included in the vehicle sensor 20 outputs a detection signal indicating a result of detection to the vehicle control device 100.

The HMI 30 is a notification device that presents various types of information to an occupant of a host vehicle M1. The HMI 30 receives an input operation by the occupant. The HMI 30 includes various display devices, speakers, buzzers, touch panels, switches, keys, and the like. Each device of the HMI 30 is attached to, for example, any place of each part of the instrument panel, the passenger seat, or the rear seat.

The blinker device 40 includes a blinker ECU 40*a* and a blinker 40*b*. The blinker ECU 40*a* controls activation of the blinker 40*b* according to information input from the vehicle control device 100 or information input from the driving operator 50. The blinker 40*b* is a lamp that indicates a direction of turning right or left or a direction of changing courses to the surroundings by blinking. When an occupant operates a blinker lever 50*a*, which will be described below, the blinker ECU 40*a* activates the blinker 40*b* corresponding to a lever position detected by a lever position detection unit 50*b*. Furthermore, while the blinker 40*b* is activated, the blinker ECU 40*a* transmits information indicating that the blinker 40*b* is activated to a control unit 120.

The driving operator 50 includes various operators such as a steering wheel, a blinker lever (a direction indication switch) 50*a* for switching between activation and stop of the blinker 40*b*, an accelerator pedal, a brake pedal, and a shift lever. For example, a detection unit that detects an amount of operation performed by an occupant is attached to each operator of the driving operator 50. For example, the blinker lever 50*a* is provided with a lever position detection unit 50*b*. The lever position detection unit 50*b* detects a position of the blinker lever 50*a*. In addition, a detection unit provided on an accelerator pedal or a brake pedal detects an amount of depression of a corresponding pedal, and a detection unit provided on the steering wheel detects a steering angle, a steering torque, and the like of the steering wheel. Each detection unit (including the lever position detection unit 50*b*) outputs a detection signal indicating a result of the detection to the vehicle control device 100, or one or all of the traveling drive force output device 200, the brake device 210, and the steering device 220. The blinker lever 50a is an example of the "operation unit."

Figure 2:
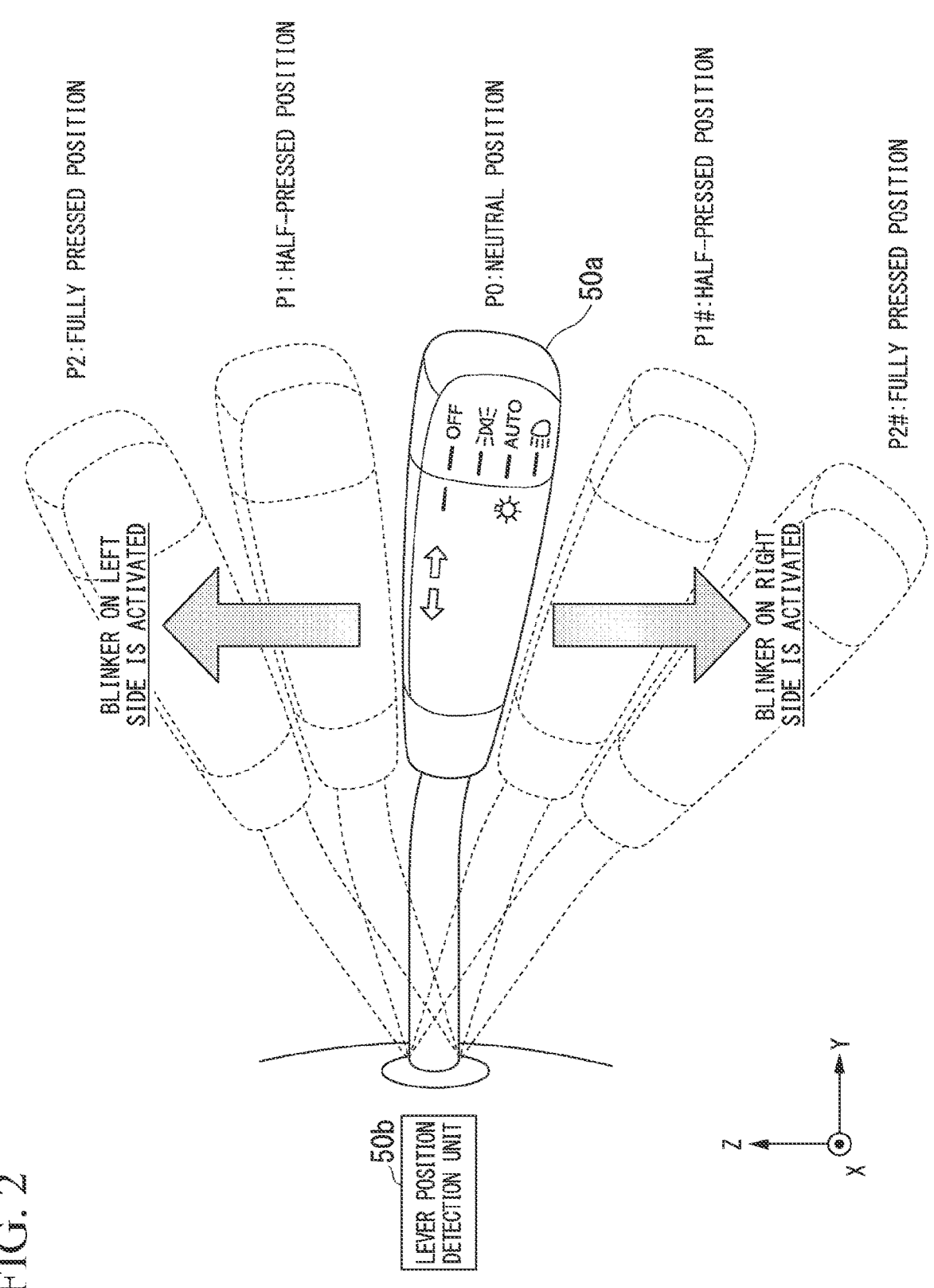
FIG. 2 is a diagram for describing a position of a blinker lever.

FIG. 2 is a diagram for describing the position of the blinker lever 50a. In FIG. 2, X represents a forward or backward direction of the host vehicle M, Y represents a width direction of the host vehicle M, and Z represents a vertical direction of the host vehicle M. For example, one end of the blinker lever 50a is supported at a certain place. When an operation is received from an occupant, the blinker lever 50a rotates in the vertical direction (the Z direction) starting from a support place at one end thereof.

As in the shown example, when the blinker lever 50a rotates upward from a neutral position P0 and moves to a half-pressed position P1 or a fully pressed position P2, a blinker 40b on a left side of the host vehicle M is activated. "Activation" refers to an operation of lighting or blinking a lamp (a turn lamp) functioning as the blinker 40b.

The neutral position P0 is a position at which the blinker 40b is not operated, and this position is maintained when the blinker lever 50a is not operated.

The half-pressed position P1 is a position where the blinker 40b on the left side of the host vehicle M is operated, this position is maintained while the blinker lever 50a is operated, and the position of the blinker lever 50a moves to the neutral position P0 at a timing when the blinker lever 50a is no longer operated. For example, when the occupant manually pushes up the blinker lever 50a to the half-pressed position P1, the blinker 40b on the left side is activated to be lit or blink a predetermined number of times (for example, three times) or for a predetermined period of time (for example, several seconds). When the occupant releases his or her hand in this state, the blinker lever 50a moves to the neutral position P0 by itself, and the activated blinker 40b on the left side stops.

The fully pressed position P2 is a position where the blinker 40b on the left side of the host vehicle M is activated, and this position is maintained when the blinker lever 50a is not operated. That is, once the occupant pushes up the blinker lever 50a to the fully pressed position P2, the blinker 40b on the left side continues to be activated until the occupant pushes down the blinker lever 50a.

In addition, as in the shown example, when the blinker lever 50a rotates downward from the neutral position P0 and moves to the half-pressed position P1# or the fully pressed position P2#, the blinker 40b on the right side of the host vehicle M is activated.

The half-pressed position P1# is a position where the blinker 40b on the right side of the host vehicle M is activated, this position is maintained while the blinker lever 50a is operated, and the position of the blinker lever 50a moves to the neutral position P0 at a timing when the blinker lever 50a is no longer operated. For example, when the occupant manually pushes down the blinker lever 50a to the half-pressed position P1#, the blinker 40b on the right side is activated to be lit or blink a predetermined number of times (for example, three times) or for a predetermined period of time (for example, several seconds). When the occupant releases his or her hand in this state, the blinker lever 50a moves to the neutral position P0 by itself, and the activated blinker 40b on the right side stops.

The fully pressed position P2# is a position where the blinker 40b on the right side of the host vehicle M is activated, and this position is maintained when the blinker lever 50a is not operated. That is, once the occupant pushes down the blinker lever 50a to the fully pressed position P2, the blinker 40b on the right side continues to be activated until the occupant pushes up the blinker lever 50a.

The lever position detection unit 50b detects, for example, where the blinker lever 50a is positioned among a neutral position P0, a half-pressed position P1, a fully pressed position P2, a half-pressed position P1#, and a fully pressed position P2#.

In addition, after moving to the fully pressed position P2 or P2#, the blinker lever 50a may return to the neutral position P0 by itself when the steering wheel returns to the neutral position by using a rotation of a shaft (a rotation axis) of the steering wheel. That is, the blinker lever 50a may have an auto-canceller function.

Prior to description of the vehicle control device 100, the traveling drive force output device 200, the brake device 210, and the steering device 220 will be described. The traveling drive force output device 200 outputs traveling drive force (torque) for traveling of the host vehicle M to a driving wheel. The traveling drive force output device 200 includes, for example, a combination of an internal combustion engine, an electric motor, a transmission, and the like, and a power electronic control unit (ECU) that controls these. The power ECU controls the constituents described above according to the information input from the vehicle control device 100 or the information input from the driving operator 50.

The brake device 210 includes, for example, a brake caliper, a cylinder that transmits hydraulic pressure to the brake caliper, an electric motor that causes the cylinder to generate hydraulic pressure, and a brake ECU. The brake ECU controls the electric motor according to information input from the vehicle control device 100 or information input from a driving operator 50 so that a brake torque corresponding to a braking operation is output to each wheel. The brake device 210 may include a mechanism for transmitting the hydraulic pressure generated by operating the brake pedal included in the driving operator 50 to the cylinder via a master cylinder as a backup mechanism. The brake device 210 is not limited to the configuration described above, and may be an electronically controlled hydraulic brake device that controls the actuator according to the information input from the vehicle control device 100 and transmits the hydraulic pressure of the master cylinder to the cylinder.

The steering device 220 includes, for example, a steering ECU and an electric motor. For example, an electric motor applies force to a rack and pinion mechanism to change a direction of a steering wheel. The steering ECU drives the electric motor and changes the direction of the steering wheel according to information input from the vehicle control device 100 or information input from the driving operator 50.

[Vehicle Control Device]

Returning to FIG. 1, the vehicle control device 100 includes, for example, a recognition unit 110 and a control unit 120. These components are each realized by, for example, a hardware processor such as a central processing unit (CPU) executing a program (software). In addition, some or all of these components may be realized by hardware (a circuit unit: including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the vehicle control device 100, or may be stored in a detachable storage medium such as a DVD or a CD-ROM and installed in the HDD or flash memory of the vehicle control device 100 by the storage medium (non-transitory storage medium) being attached to a drive device.

The recognition unit 110 recognizes a surrounding situation of the host vehicle M on the basis of information input from the object detection device 10. The recognition unit 110 recognizes, for example, a type, a position, a speed, an acceleration, and the like of an object in the surroundings of the host vehicle M. The position of the object is recognized as, for example, a position in absolute coordinates with a representative point of the host vehicle M (a center of gravity, a center of a drive shaft, or the like) as the origin, and is used for control. The position of an object may be expressed by a representative point such as the center of gravity or a corner of the object, or may be expressed by an expressed area. A "state" of an object may include the acceleration, the jerk, or a "behavioral state" (for example, whether it is changing lanes or is about to change lanes) of the object. In this manner, the recognition unit 110 recognizes an object that is present at least on the traveling direction side of the host vehicle M and with which contact needs to be avoided by the host vehicle M.

In addition, the recognition unit 110 recognizes, for example, a lane in which the host vehicle M is traveling (a traveling lane). For example, the recognition unit 110 recognizes a position and a posture of the host vehicle M with respect to the traveling lane. For example, the recognition unit 110 may recognize a deviation of a reference point of the host vehicle M from a center of the lane and an angle of the traveling direction of the host vehicle M formed with respect to a line connecting the center of the lane as a relative position and the posture of the host vehicle M with respect to the traveling lane. Instead of this, the recognition unit 110 may also recognize a position of the reference point of the host vehicle M with respect to either side edge of the traveling lane (a road lane marking or a road boundary) as the relative position of the host vehicle M with respect to the traveling lane.

The control unit 120 generates a target route TR of the host vehicle M on the basis of the surrounding situation recognized by the recognition unit 110, and performs lane keeping control (LKAS: Lane Keeping Assist System) of the host vehicle M along the target route TR. More specifically, for example, the control unit 120 generates the target route TR as an intermediate line between a left road marking line and a right road marking line present in front of the host vehicle M, recognized by the recognition unit 110, and when a steering torque applied to the steering wheel by the occupant is in a direction that deviates from the target route TR, a reaction force is applied to the steering operation in that direction. The control unit 120 increases the reaction force applied to the steering operation as a deviation distance of the host vehicle M from the target route TR increases (in other words, as the host vehicle M approaches the road lane marking). The control unit 120 stops the lane keeping control while the blinker lever 50a is moved to the fully pressed position or the half-pressed position and the blinker 40b is lit or blinking. A case in which the blinker lever 50a is moved to the fully pressed position is an example of a "first case," and a case in which the blinker lever 50a is moved to the half-pressed position is an example of a "second case."

Furthermore, the control unit 120 performs auto lane change assist (ALCA) of assisting the host vehicle M with changing lanes from the traveling lane to an adjacent lane, on the basis of the surrounding situation recognized by the recognition unit 110. For example, when the blinker lever 50a is positioned in the half-pressed position P1 or P1# for a first predetermined time Ta or longer, the control unit 120 determines whether it is possible to change lanes to an adjacent lane on the blinker side, which is activated depending on a position in which the blinker lever 50a is positioned (for example, a right adjacent lane if the right blinker 40b is activated) among adjacent lanes on the right and left sides of the host vehicle M. For example, the control unit 120 determines that a lane change is possible when predetermined conditions are satisfied, and determines that a lane change is not possible when the predetermined conditions are not satisfied. The predetermined conditions include, for example, some or all of conditions such as "there are no obstacles in a lane that is a lane change destination," "a lane marking that divides the lane that is a lane change destination and a host lane is not a road marking that indicates prohibition of lane changes (prohibiting the vehicle from moving beyond the lane)," "the lane that is a lane change destination is recognized (actually present)," "a yaw rate detected by the vehicle sensor 20 is less than a threshold value," "a radius of curvature of a road on which the vehicle is traveling is equal to or greater than a predetermined value," "a speed of the host vehicle M is within a predetermined speed range," and "other driving assists with a higher priority than a steering assist for changing lanes are not being performed."

When the control unit 120 determines that the predetermined conditions are satisfied, the control unit 120 controls the traveling drive force output device 200, the brake device 210, and the steering device 220 without depending on an operation of the steering wheel (steering operation) by the occupant, and the host vehicle M is caused to change lanes to an adjacent lane where it has been determined that a lane change is possible. At this time, the control unit 120 activates the blinker 40b corresponding to a direction of a lane change destination.

[LKAS and ALCA Control]

In this manner, the control unit 120 executes an LKAS and an ALCA on the basis of the surrounding situation recognized by the recognition unit 110, but in the conventional technology, there are cases in which the LKAS and ALCA cannot be appropriately controlled according to an operation of the blinker lever 50a, which may impair the steering sense of the occupant. Control of the LKAS and ALCA according to the present embodiment will be described below with reference to FIGS. 3 to 5.

Figure 3:
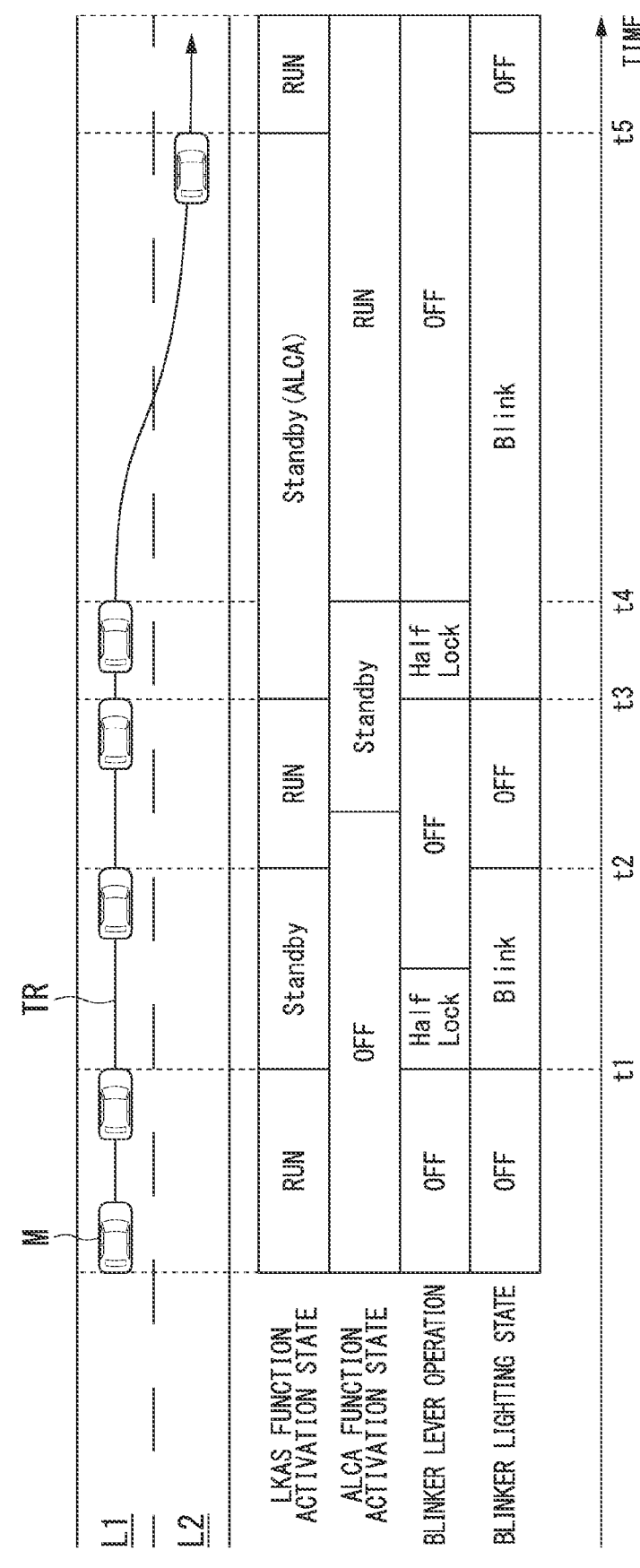
FIG. 3 is a diagram which shows an example of a flow of control of an LKAS and an ALCA according to the present embodiment.

FIG. 3 is a diagram which shows an example of a flow of control of the LKAS and the ALCA according to the present embodiment. FIG. 3 shows a situation in which the host vehicle M changes lanes from a lane L1 to a lane L2. First, at a time t1, the occupant attempts to activate the ALCA by moving the blinker lever 50a to the half-pressed position P1#(Half Lock in FIG. 3). At this time, the control unit 120 determines that the predetermined conditions for activating the ALCA are not satisfied, and keeps the ALCA stopped (OFF) without activating it.

In response to the blinker lever 50a being moved to the half-pressed position P1# at the time t1, the control unit 120 causes the blinker 40b to blink a predetermined number of times or for a predetermined period of time. The control unit 120 switches the LKAS from an activated state (RUN) to a standby state (Standby) and stops a function of the LKAS while the blinker 40b is blinking. This is because, when the occupant moves the blinker lever 50a to the half-pressed position P1#, the occupant may change lanes according to his or her own steering operation even in a situation where the function of the ALCA is not activated. That is, by temporarily stopping the function of the LKAS while the blinker 40*b* is blinking, it is possible to improve the steering sense of the occupant who attempts to change lanes according to his or her own steering operation.

Thereafter, at a time t3, the occupant moves the blinker lever 50*a* again to the half-pressed position P1# and attempts to activate the ALCA. At this time, the control unit 120 determines that the predetermined conditions for activating the ALCA are satisfied, activates the ALCA at a time t4 when the operation of the blinker lever 50*a* is completed, and completes the lane change at a time t5. Similarly to a period from the time t1 to the time t2, during a period from the time t3 to the time t5, the control unit 120 stops the function of the LKAS while the blinker 40*b* is blinking.

FIG. 4 is a diagram which shows another example of the flow of the control of the LKAS and the ALCA according to the present embodiment. Similar to FIG. 3, FIG. 4 shows a situation in which the host vehicle M changes lanes from the lane L1 to the lane L2. First, at the time t1, the occupant attempts to activate the ALCA by moving the blinker lever 50*a* to the half-pressed position P1# (Half Lock in FIG. 4). At this time, the control unit 120 determines that the predetermined conditions for activating the ALCA are not satisfied, and keeps the ALCA stopped (OFF) without activating it.

In response to the blinker lever 50*a* being moved to the half-pressed position P1# at the time t1, the control unit 120 causes the blinker 40*b* to blink a predetermined number of times or for a predetermined period of time. The control unit 120 switches the LKAS from the activated state (RUN) to the standby state (Standby) and stops the function of the LKAS while the blinker 40*b* is blinking.

Thereafter, at the time t3, the occupant moves the blinker lever 50*a* again to the half-pressed position P1# and attempts to activate the ALCA. At this time, the control unit 120 also determines that the predetermined conditions for activating the ALCA are not satisfied, keeps it stopped (OFF), and causes the blinker 40*b* to blink a predetermined number of times or for a predetermined period of time.

Thereafter, at the time t4, the control unit 120 determines that the predetermined conditions for activating the ALCA are satisfied, and sets the ALCA to the standby state (Standby). That is, at the time t4, the ALCA can be activated, but the control unit 120 keeps the LKAS and the ALCA continuously stopped because it is considered that the blinker 40*b* is lit and there is a possibility of the occupant attempting to change lanes according to his or her own steering. In other words, the control unit 120 keeps the LKAS and ALCA stopped even if the feasibility of the ALCA being performed changes from being not possible to being possible (that is, from OFF to Standby) while the blinker 40*b* is lit.

Thereafter, at the time t5, the occupant moves the blinker lever 50*a* to the half-pressed position P1# again. At this time, the blinker 40*b* continues to blink from the time t3, which means that the occupant has moved the blinker lever 50*a* to the half-pressed position P1# again while the blinker 40*b* was lit. It is presumed that an intention of the occupant at this time was to attempt to change lanes according to his or her own steering operation and to move the blinker lever 50*a* to the half-pressed position P1# again because the ALCA was not activated at the time t3. For this reason, as in the case of the time t4 described above, the control unit 120 keeps the LKAS and ALCA continuously stopped. As a result, the occupant can change lanes of the host vehicle M (indicated by a dotted line in FIG. 4) according to his or her own steering operation, and the steering sense of the occupant can be improved FIG. 5 is a diagram which shows another example of the flow of the control of the LKAS and the ALCA according to the present embodiment. Similar to FIGS. 3 and 4, FIG. 5 shows a situation in which the host vehicle M changes lanes from the lane L1 to the lane L2. First, at the time t1, the occupant attempts to activate the ALCA by moving the blinker lever 50*a* to the half-pressed position P1# (Half Lock in FIG. 5). At this time, the control unit 120 determines that the predetermined conditions for activating the ALCA are not satisfied, and keeps the ALCA stopped (OFF) without activating it.

In response to the blinker lever 50*a* being moved to the half-pressed position P1# at the time t1, the control unit 120 causes the blinker 40*b* to blink a predetermined number of times or for a predetermined period of time. The control unit 120 switches the LKAS from the activated state (RUN) to the standby state (Standby) and stops the function of the LKAS while the blinker 40*b* is blinking.

Thereafter, at the time t3, the occupant moves the blinker lever 50*a* to the half-pressed position P1# again and attempts to activate the ALCA. At this time, the control unit 120 also determines that the predetermined conditions for activating the ALCA are not satisfied, keeps the ALCA stopped (OFF) without activating it, and causes the blinker 40*b* to blink a predetermined number of times or for a predetermined period of time. Thereafter, the blinking of the blinker 40*b* is completed at the time t4.

Thereafter, at the time t5, the occupant moves the blinker lever 50*a* to the half-pressed position P1# again. At this time, unlike the case in FIG. 4, the blinking of the blinker 40*b* is completed, and at the same time, the function of the ALCA is in the standby state. For this reason, the control unit 120 activates the ALCA and completes the lane change at a time t6. As described above, according to the present embodiment, when the ALCA is in the standby state, the ALCA is not always activated in response to the operation of the blinker lever 50*a*, but is determined to be activated or not depending on whether the blinker 40*b* is blinking. As a result, the steering sense of the occupant can be improved.

[Flow of Processing]

Figure 6:
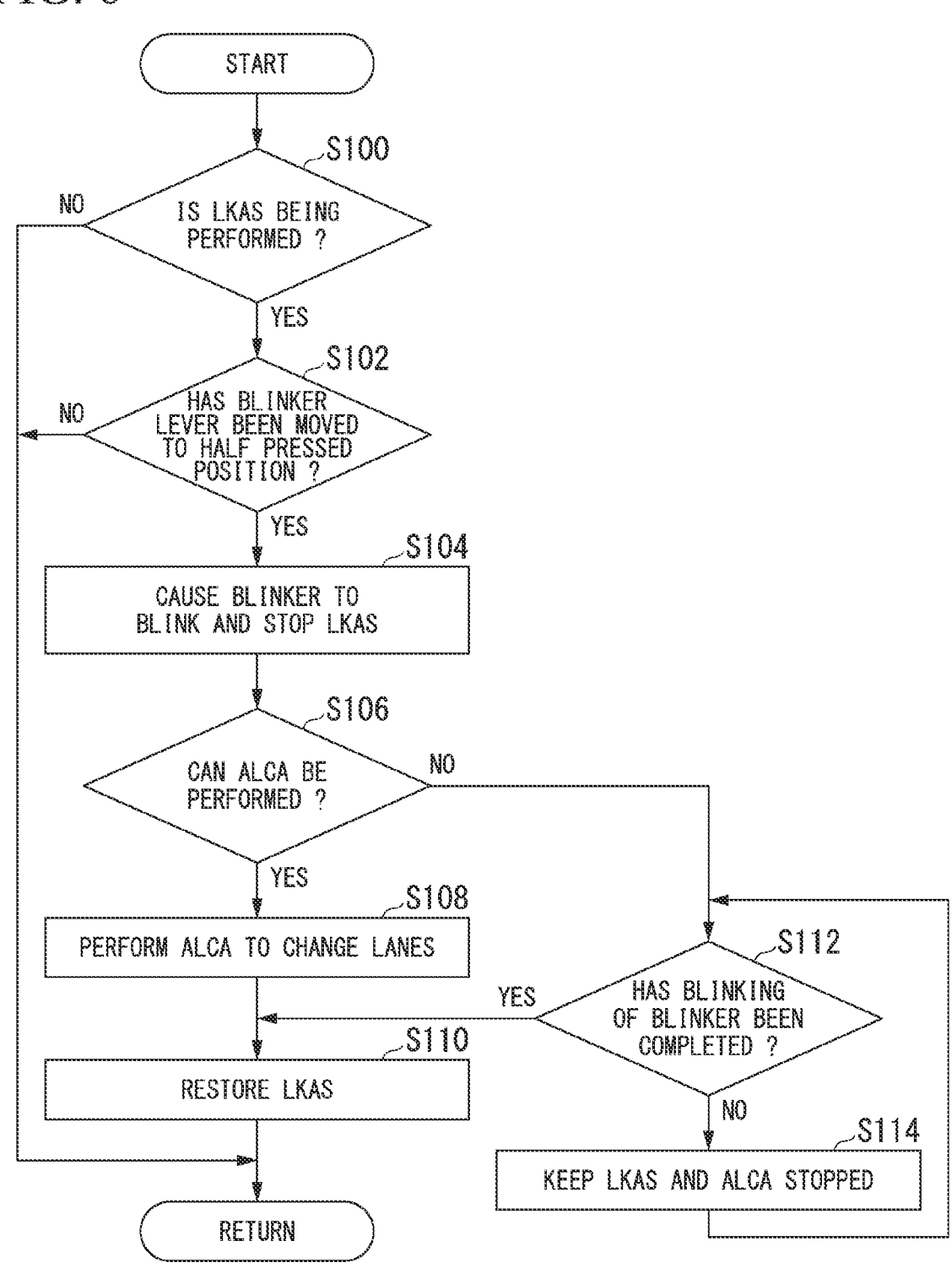
FIG. 6 is a flowchart which shows an example of a flow of processing executed by the vehicle control device according to the present embodiment.

Next, with reference to FIG. 6, a flow of processing executed by the vehicle control device 100 according to the present embodiment will be described. FIG. 6 is a flowchart which shows an example of the flow of processing executed by the vehicle control device 100 according to the present embodiment. The processing according to this flowchart is repeatedly executed while the host vehicle M is traveling.

First, the control unit 120 determines whether the LKAS is being performed (step S100). When it is determined that the LKAS is not being performed, the control unit 120 completes the processing of this flowchart. On the other hand, when it is determined that the LKAS is being performed, the control unit 120 determines whether the blinker lever 50*a* has been moved to a half-pressed position (step S102). When it is determined that the blinker lever 50*a* has not been moved to the half-pressed position, the control unit 120 ends the processing of this flowchart.

On the other hand, when it is determined that the blinker lever 50*a* has been moved to the half-pressed position, the control unit 120 causes the blinker 40*b* to blink and stops the LKAS (step S104). Next, the control unit 120 determines whether the ALCA can be performed on the basis of the surrounding situation recognized by the recognition unit 110 (step S106). When it is determined that the ALCA can be performed, the control unit 120 performs the ALCA and completes the lane change (step S108). Next, the control unit 120 causes the LKAS to be restored (step S110), and completes the processing of this flowchart.

On the other hand, when it is determined that the ALCA cannot be performed, the control unit 120 determines whether the blinker 40*b* has completed blinking (step S112). When it is determined that the blinking of the blinker 40*b* is completed, the control unit 120 advances the processing to step S110. On the other hand, when it is determined that the blinking of the blinker 40*b* is not completed, the control unit 120 keeps the LKAS and the ALCA stopped (step S114). In particular, at this time, even if the ALCA can be performed on the basis of the surrounding situation recognized by the recognition unit 110, the control unit 120 keeps the LKAS and the ALCA stopped. After that, the control unit 120 advances the processing to step S112. As a result, the processing of this flowchart is completed.

According to the embodiment described above, the blinker lever is moved to the half-pressed position, and the lane keeping control is stopped while the blinker is activated. As a result, the steering sense of the occupant during lane keeping control can be improved.

Embodiments described above can be expressed as follows.

A vehicle control device is configured to include a storage medium that stores computer-readable instructions and a processor that is connected to the storage medium, wherein the processor executes the computer-readable instructions to recognize a surrounding situation of a vehicle, generate a target route of the vehicle on the basis of the recognized surrounding situation to perform lane keeping control of the vehicle along the target route, and stop the lane keeping control while a direction indicator is activated in both of a first case in which the direction indicator is continuously operated by operating an operating unit from a reference position to a first position and a second case in which the direction indicator is activated a predetermined number of times or for a predetermined period of time by operating the operating unit from the reference position to a second position where an amount of operation is smaller than at the first position.

Although a mode for implementing the present invention has been described above using embodiments, the present invention is not limited to these embodiments in any way, and various modifications and substitutions can be added within a range not departing from the gist of the present invention.

What is claimed is:

1. A vehicle control device comprising:

a storage medium configured to store computer-readable instructions; and a processor connected to the storage medium, wherein the processor executes the computer-readable instructions to recognize a surrounding situation of a vehicle, generate a target route of the vehicle on the basis of the recognized surrounding situation to perform lane keeping control of the vehicle along the target route by applying a reaction force to a steering operation when a steering torque is applied to a steering wheel by an occupant of the vehicle in a direction that deviates from the target route, and stop the lane keeping control while a direction indicator is activated in both of a first case in which the direction indicator is continuously operated by operating an operating unit from a reference position to a first position and a second case in which the direction indicator is activated a predetermined number of times or for a predetermined period of time by operating the operating unit from the reference position to a second position where an amount of operation is smaller than at the first position, wherein the processor determines whether it is possible to perform lane change control on the basis of the surrounding situation when the operating unit is operated to the second position, and performs lane change control from a lane in which the vehicle is traveling to an adjacent lane in a direction in which the operating unit is operated when it is determined that it is possible to perform the lane change control, wherein the processor stops the lane keeping control during activation of the direction indicator when the operating unit is operated to the second position and it is determined that it is not possible to perform the lane change control, and wherein, when the operating unit is operated to the second position, the processor stops the lane keeping control and the lane change control during the activation of the direction indicator even if determination on whether it is possible to perform the lane change control is changed from a state of being impossible to a state of being possible on the basis of the surrounding situation during the activation of the direction indicator.

2. The vehicle control device according to claim 1, wherein, when determination on whether it is possible to perform the lane change control is changed from the state of being impossible to the state of being possible on the basis of the surrounding situation during the activation of the direction indicator after the operating unit is operated to the second position, the processor stops the lane keeping control and the lane change control for a certain period of time even if the operating unit is operated to the second position again.

3. A vehicle control method comprising:

by a computer, recognizing a surrounding situation of a vehicle;

generating a target route of the vehicle on the basis of the recognized surrounding situation to perform lane keeping control of the vehicle along the target route by applying a reaction force to a steering operation when a steering torque is applied to a steering wheel by an occupant of the vehicle in a direction that deviates from the target route; and stopping the lane keeping control while a direction indicator is activated in both of a first case in which the direction indicator is continuously operated by operating an operating unit from a reference position to a first position and a second case in which the direction indicator is activated a predetermined number of times or for a predetermined period of time by operating the operating unit from the reference position to a second position where an amount of operation is smaller than at the first position, wherein the vehicle control method further comprises determining whether it is possible to perform lane change control on the basis of the surrounding situation when the operating unit is operated to the second position, and performs lane change control from a lane in which the vehicle is traveling to an adjacent lane in a direction in which the operating unit is operated when it is determined that it is possible to perform the lane change control, wherein the vehicle control method further comprises stopping the lane keeping control during activation of the direction indicator when the operating unit is operated to the second position and it is determined that it is not possible to perform the lane change control, and wherein, when the operating unit is operated to the second position, the computer stops the lane keeping control and the lane change control during the activation of the direction indicator even if determination on whether it is possible to perform the lane change control is changed from a state of being impossible to a state of being possible on the basis of the surrounding situation during the activation of the direction indicator.

4. A computer-readable non-transitory storage medium that stores a program causing a computer to execute:

recognizing a surrounding situation of a vehicle;

generating a target route of the vehicle on the basis of the recognized surrounding situation to perform lane keeping control of the vehicle along the target route by applying a reaction force to a steering operation when a steering torque is applied to a steering wheel by an occupant of the vehicle in a direction that deviates from the target route; and stopping the lane keeping control while a direction indicator is activated in both of a first case in which the direction indicator is continuously operated by operating an operating unit from a reference position to a first position and a second case in which the direction indicator is activated a predetermined number of times or for a predetermined period of time by operating the operating unit from the reference position to a second position where an amount of operation is smaller than at the first position, wherein the program further causes the computer to execute:

determining whether it is possible to perform lane change control on the basis of the surrounding situation when the operating unit is operated to the second position, and performs lane change control from a lane in which the vehicle is traveling to an adjacent lane in a direction in which the operating unit is operated when it is determined that it is possible to perform the lane change control, and stopping the lane keeping control during activation of the direction indicator when the operating unit is operated to the second position and it is determined that it is not possible to perform the lane change control, wherein, when the operating unit is operated to the second position, the computer stops the lane keeping control and the lane change control during the activation of the direction indicator even if determination on whether it is possible to perform the lane change control is changed from a state of being impossible to a state of being possible on the basis of the surrounding situation during the activation of the direction indicator.

5. A vehicle control device comprising:

a storage medium configured to store computer-readable instructions; and a processor connected to the storage medium, wherein the processor executes the computer-readable instructions to recognize a surrounding situation of a vehicle, generate a target route of the vehicle on the basis of the recognized surrounding situation to perform lane keeping control of the vehicle along the target route by applying a reaction force to a steering operation when a steering torque is applied to a steering wheel by an occupant of the vehicle in a direction that deviates from the target route, and stop the lane keeping control while a direction indicator is activated in both of a first case in which the direction indicator is continuously operated by operating an operating unit from a reference position to a first position and a second case in which the direction indicator is activated a predetermined number of times or for a predetermined period of time by operating the operating unit from the reference position to a second position where an amount of operation is smaller than at the first position, wherein the processor determines whether it is possible to perform lane change control on the basis of the surrounding situation when the operating unit is operated to the second position, and performs lane change control from a lane in which the vehicle is traveling to an adjacent lane in a direction in which the operating unit is operated when it is determined that it is possible to perform the lane change control, wherein the processor stops the lane keeping control during activation of the direction indicator when the operating unit is operated to the second position and it is determined that it is not possible to perform the lane change control, and wherein, when determination on whether it is possible to perform the lane change control is changed from a state of being impossible to a state of being possible on the basis of the surrounding situation during the activation of the direction indicator after the operating unit is operated to the second position, the processor stops the lane keeping control and the lane change control for a certain period of time even if the operating unit is operated to the second position again.

* * * * *